(12) United States Patent
Bindle et al.

(10) Patent No.: US 9,923,782 B1
(45) Date of Patent: Mar. 20, 2018

(54) COMPUTER NETWORK VIRTUAL ENTITY PATHWAY VISUALIZATION SYSTEM

(71) Applicant: VMWARE, INC., Palo Alto, CA (US)

(72) Inventors: Sanket Bindle, Gujarat (IN); Ajinkya Harkare, Indore (IN); Rohit Toshniwal, Santa Clara, CA (US); Mukul Gupta, San Jose, CA (US); Shiv Agarwal, Milpitas, CA (US); Raunaq Gupta, Delhi (IN)

(73) Assignee: VMware, Inc., Palo Alto, CA (US)

( * ) Notice: Subject to any disclaimer, the term of this patent is extended or adjusted under 35 U.S.C. 154(b) by 529 days.

(21) Appl. No.: 14/592,815

(22) Filed: Jan. 8, 2015

Related U.S. Application Data

(63) Continuation-in-part of application No. 14/464,579, filed on Aug. 20, 2014.

(51) Int. Cl.
  *G06F 15/00* (2006.01)
  *G06F 13/00* (2006.01)
  *H04L 12/24* (2006.01)
  *G06F 3/0481* (2013.01)

(52) U.S. Cl.
  CPC .......... *H04L 41/22* (2013.01); *G06F 3/04817* (2013.01); *H04L 41/12* (2013.01)

(58) Field of Classification Search
  CPC .................................................. G06F 3/033
  USPC ................ 715/778, 863, 761–763, 740, 780
  See application file for complete search history.

(56) References Cited

U.S. PATENT DOCUMENTS

| | | |
|---|---|---|
| 4,958,285 A | 9/1990 | Tominaga |
| 6,433,802 B1 | 8/2002 | Ladd |
| 6,483,812 B1 | 11/2002 | Prorock |
| 7,096,219 B1 | 8/2006 | Karch |
| 7,788,587 B2 | 8/2010 | Michelman |
| 7,992,102 B1 | 8/2011 | De Angelo et al. |
| 8,230,339 B2 | 7/2012 | Watanabe et al. |
| 8,266,550 B1 * | 9/2012 | Cleron .................. G06F 1/1633 345/173 |
| 8,443,293 B2 | 5/2013 | Soerensen et al. |
| 9,015,730 B1 | 4/2015 | Allen et al. |
| 2002/0186827 A1 | 12/2002 | Griffiths |
| 2003/0184580 A1 | 10/2003 | Kodosky et al. |
| 2006/0052998 A1 | 3/2006 | Michelman |
| 2006/0106585 A1 | 5/2006 | Brown et al. |
| 2007/0274239 A1 | 11/2007 | Nguyen et al. |
| 2008/0059487 A1 | 3/2008 | Mi et al. |
| 2008/0195677 A1 | 8/2008 | Sudhakar et al. |
| 2008/0288637 A1 | 11/2008 | Nagaraja et al. |

(Continued)

*Primary Examiner* — Kevin Nguyen
(74) *Attorney, Agent, or Firm* — Clayton, McKay & Bailey PC

(57) ABSTRACT

A computerized virtual entity pathway visualization method and system provide a virtual entity packet pathway display indicating a packet pathway along which a data packet would travel from between virtual entities (e.g., virtual machines) in a computer system. One implementation includes modeling of a computer system having physical and virtual entities, identifying a packet pathway from a source virtual entity in the computer system to a destination virtual entity in the computer system, and rendering on a computer display screen a packet pathway and an arrangement of plural active icons corresponding to physical and virtual entities included in the packet pathway from the source virtual entity to the destination virtual entity.

20 Claims, 11 Drawing Sheets

(56) References Cited

U.S. PATENT DOCUMENTS

| | | | |
|---|---|---|---|
| 2009/0144148 A1* | 6/2009 | Jung | G06Q 30/06 705/14.23 |
| 2009/0216572 A1 | 8/2009 | Anderson | |
| 2009/0276771 A1* | 11/2009 | Nickolov | G06F 9/4856 717/177 |
| 2010/0064225 A1 | 3/2010 | Cunningham et al. | |
| 2010/0180092 A1 | 7/2010 | Rajaa et al. | |
| 2010/0257457 A1 | 10/2010 | De Goes | |
| 2011/0047466 A1 | 2/2011 | Michelman | |
| 2011/0173184 A1 | 7/2011 | Kelshikar et al. | |
| 2012/0020581 A1 | 1/2012 | Zarom | |
| 2012/0110046 A1 | 5/2012 | Oba | |
| 2012/0303325 A1 | 11/2012 | Depue et al. | |
| 2013/0124712 A1 | 5/2013 | Parker | |
| 2013/0305364 A1 | 11/2013 | Haikney et al. | |
| 2014/0369229 A1 | 12/2014 | Martineau | |

* cited by examiner

COMPUTER NETWORK VIRTUAL ENTITY PATHWAY VISUALIZATION SYSTEM

RELATED APPLICATIONS

This application claims the benefit of the filing of application Ser. No. 14/464,579, filed on Aug. 20, 2014.

BACKGROUND

Modern datacenters include large numbers of physical and virtual entities. Examples of physical entities may include application servers, storage servers, load balancers, network interface cards (NICs), firewalls, switches, routers, etc. Almost any of these physical entities can be virtualized as software entities, such as virtual machines (VM), virtual firewalls, virtual switches, virtual routers, vlans (VLANs), virtual extensible local area networks (VXLANs), etc.

Virtual entities increase the complexities of monitoring, troubleshooting, searching characteristics of, and visualizing these dynamically configurable networks. Existing systems may only monitor and collect data for a subset of physical or virtual components within the datacenter. Existing systems also may not be able to understand these new architectures, entities, and the relationships between these entities. Thus, present systems may not effectively monitor or visualize the physical and virtual entity configurations within modern datacenters, and may not provide adequate capabilities to search characteristics of such datacenters.

Additional aspects and advantages of this invention will be apparent from the following detailed description of preferred embodiments, which proceeds with reference to the accompanying drawings.

BRIEF DESCRIPTION OF THE DRAWINGS

Figures 4A, 4B, 4C:
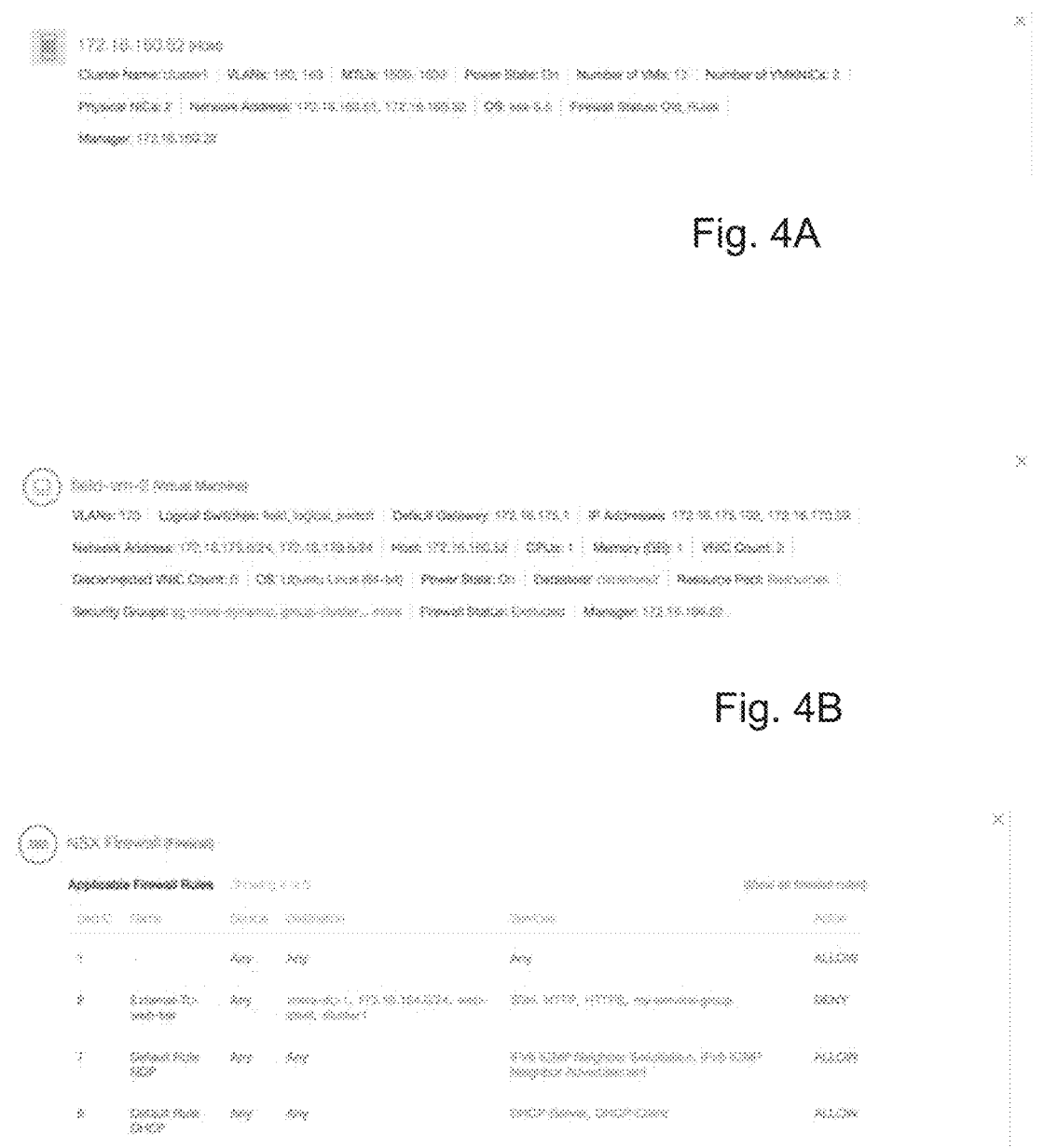

FIGS. 4A-4K illustrate sample entity information provided by user-activation of corresponding icon types virtual entity packet pathway display.

DETAILED DESCRIPTION

Figure 1:
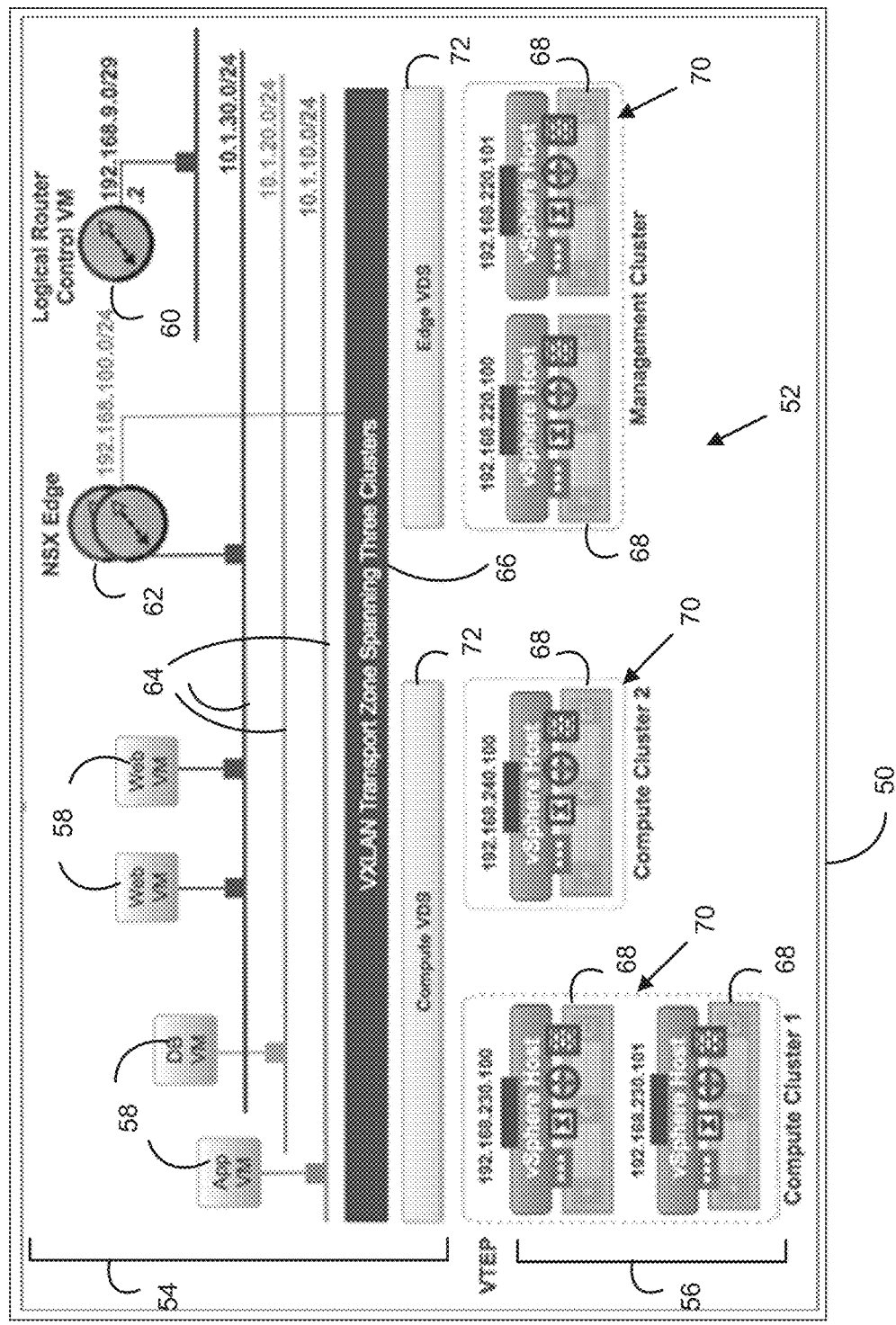
FIG. 1 is an illustration of an example of a prior art user visualization of a computer network.

FIG. 1 is an illustration of a prior art display or visualization 50 of an exemplary computer network 52 that includes virtual entities 54 and physical entities 56. Virtual entities 54 may include, for example, any or all of various virtual machines 58, a logical router 60, and an edge router 62 that may be connected to various layer 2 networks 64 associated with a virtual extensible LAN (VXLAN) 66. Physical entities 56 may include, for example, any number of host computers or servers 68 that could be arranged physically or logically in any number of clusters 70. Interconnection between virtual entities 54 and physical entities 56 may be represented, for example, by one or more virtual distributed switches (VDSs) 72.

Visualization 50 provides only a generalized representation of virtual entities 54 and physical entities 56 of network 52 without providing information about the interconnection between virtual entities 54 and physical entities 56, such as the transport pathways of data packets moving from one entity to another. As a result, visualization 50 provides at best a summary of virtual entities 54 and physical entities 56 included in network 52, but fails to provide operational information about the operation of network 52 and, in particular, packet pathways that illustrate the route a packet would travel from one virtual entity to another.

Figure 2:
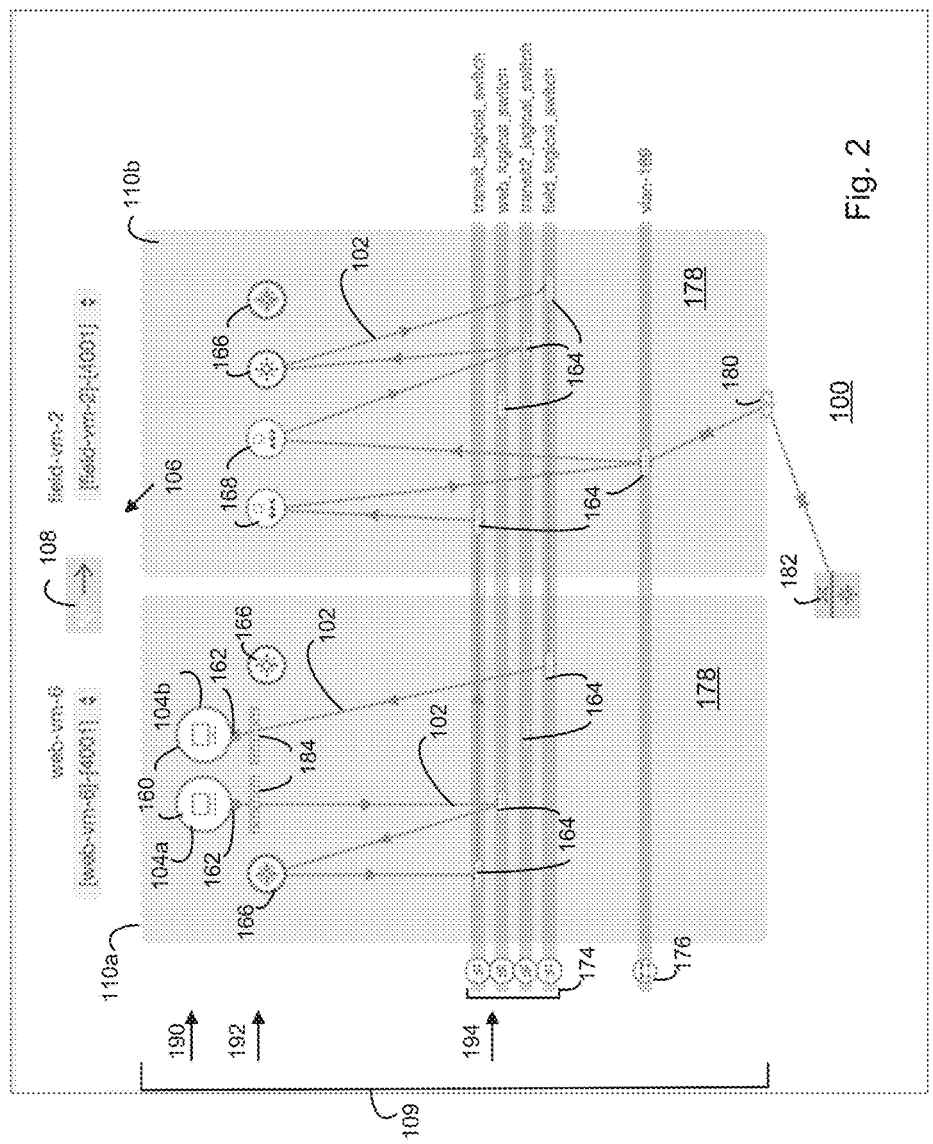
FIG. 2 is an illustration of a virtual entity packet pathway display indicating a packet pathway between virtual machines.

FIG. 2 is an illustration of a virtual entity packet pathway display 100 indicating a packet pathway 102 along which a data packet would travel from a virtual machine 104a (e.g., designated web-vm-6) to a virtual machine 104b (e.g., designated field-vm-2). Packet pathway 102 is a mere example relating to an exemplary computer network for purposes of describing aspects of packet pathway display 100. It will be appreciated that a packet pathway display 100 according to the present invention would be rendered according to the particular components and arrangement of any computer network and the corresponding virtual entity packet pathway.

The designations of virtual machines 104a and 104b are indicated in a user-selectable pathway route selection interface 106, which includes a drop-down menu from which a user can select a network interface on source virtual machine (e.g., web-vm-6-4001) and a network interface on destination virtual machine (e.g., field-vm-2) according to a route selection direction 108. Packet pathway display 100 displays packet pathway 102 with regard to both physical and virtual entities, together referred to as a packet pathway network 109, which the packet traverses from a source to a destination. For example, packet pathway display 100 displays virtual machines 104a and 104b with reference to the physical computer hosts (e.g., servers) 110a and 110b and the other entities of packet pathway network 109. With both compute resources and virtual entities, packet pathway display 100 can aid a network operator or technician in understanding or troubleshooting operation of the network. In contrast, conventional network displays did not provide such complete information, thereby hindering understanding of network operations. In this example, virtual machines 104a and 104b happen to reside on the same host 110a. It will be appreciated, however, that the source and destination virtual entities can reside on any hosts and that a packet pathway display according to this invention could render the corresponding packet pathway.

Figure 3:
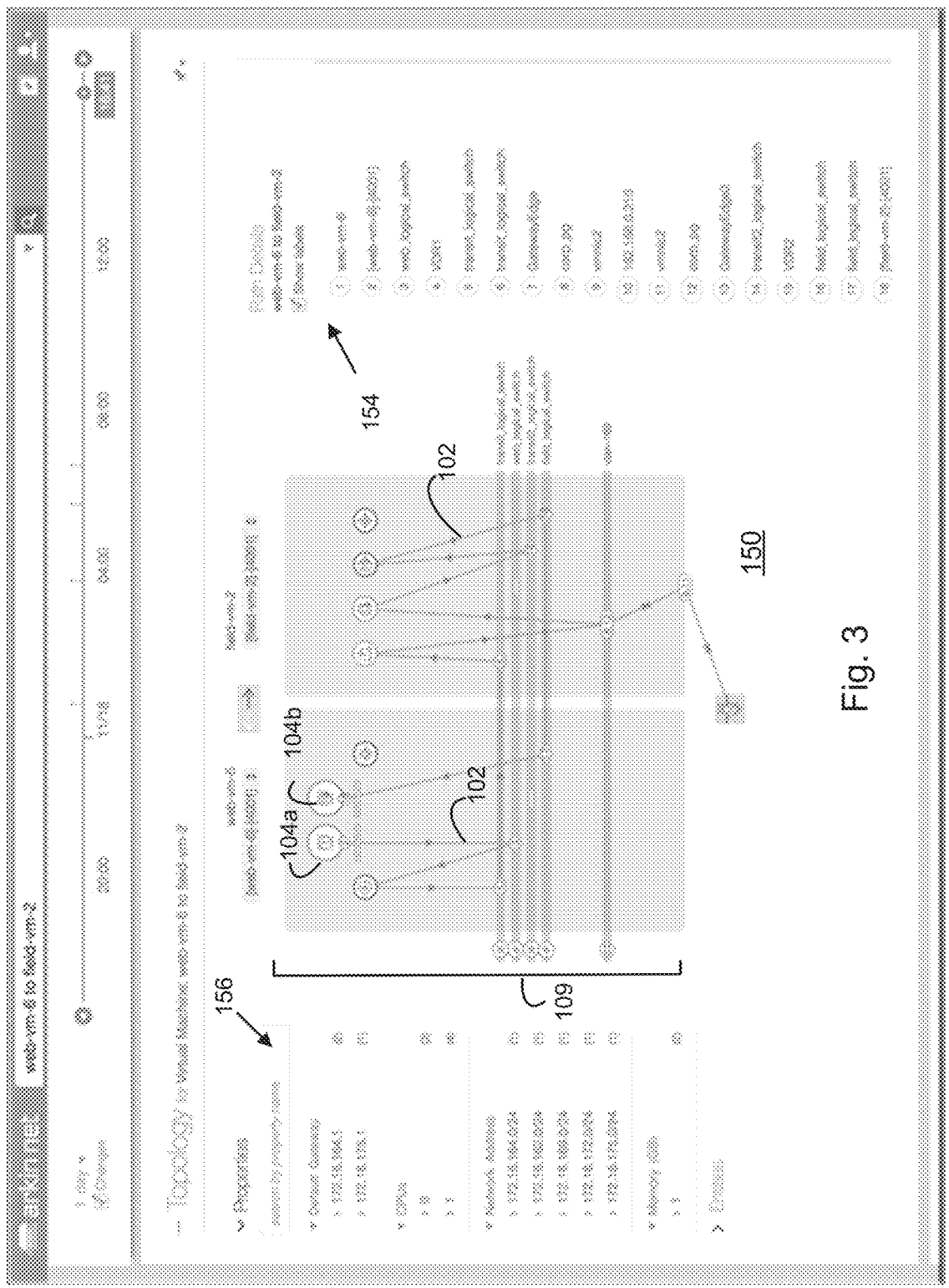
FIG. 3 is an illustration of a contextually enhanced virtual entity packet pathway display indicating a packet pathway between virtual machines.
Figure 4D:
Figure 4E:
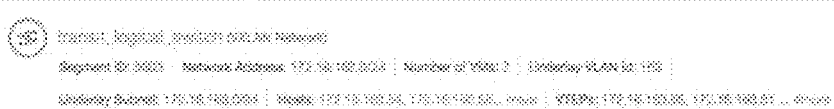
Figure 4F:
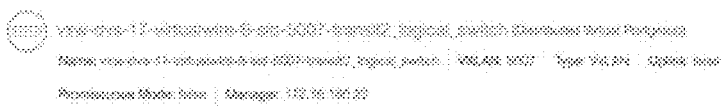
Figure 4G:
Figure 4H:
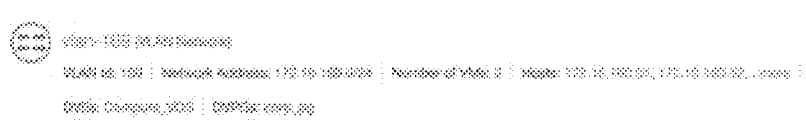
Figure 4I:
Figures 4J, 4K:
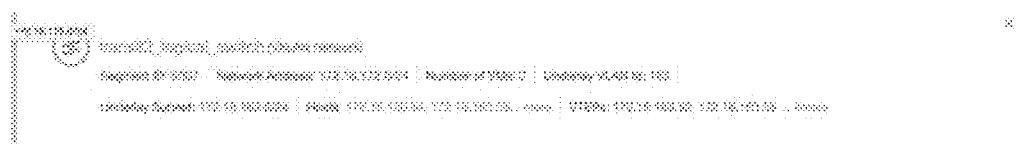

FIG. 3 is an illustration of an alternative virtual entity packet pathway display 150 indicating packet pathway 102, together with an optional path details listing 154 that specifies each entity along pathway 102 from source virtual machine 104a to destination virtual machine 104b. In the example of packet pathway 102, the path details lists entities in numerical order in which they are encountered as set forth in Table 1 below. Packet pathway display 150 also includes a network properties listing 156 that lists network addresses and other details of virtual and physical entities.

TABLE 1

| Seq. | Entity Name | Entity Type |
|---|---|---|
| 1 | web-vm-6 | source, virtual machine |
| 2 | [web-vm-6]-[4001] | "vnic"—virtual network interface card |
| 3 | web_logical_switch | distributed virtual port group on VXLAN B |
| 4 | VDR1 | virtual distributed router 1 |
| 5 | transit_logical_switch | distributed virtual port group on VXLAN A |
| 6 | transit_logical_switch | distributed virtual port group on VXLAN A |
| 7 | GatewayEdge1 | edge router 1 |
| 8 | corp_pg | distributed virtual port group on vlan-169 |
| 9 | vmnic2 | vmknic or pnic of host/server |
| 10 | 192.168.0.210 | Physical router or switch, default gateway for edge router 1 |
| 11 | vmnic2 | vmknic or pnic of host/server |
| 12 | corp_pg | distributed virtual port group on vlan-169 |
| 13 | GatewayEdge2 | edge router 2 |
| 14 | transit2_logical_switch | distributed virtual port group on VXLAN C |
| 15 | VDR2 | virtual distributed router 2 |
| 16 | field_logical_switch | distributed virtual port group on VXLAN D |
| 17 | field_logical_switch | distributed virtual port group on VXLAN D |
| 18 | [field-vm-2]-[4001] | "vnic"—virtual network interface card |
| 19 | field-vm-2 | destination, virtual machine |

In addition to the information included in path details listing 154, Table 1 includes an entity type description that indicates the type of each entity. The type description corresponds to icons included in displays 100 and 150 indicating the corresponding entities (icons reference numerals are included only in FIG. 2 for purposes of clarity), including icons 160 indicating virtual machines, icons 162 indicating virtual network interface cards, icons 164 indicating distributed virtual port groups, icons 166 indicating virtual distributed routers, icons 168 indicating edge routers or gateways, an icons 170 indicating a virtual machine network adapter or interface card (vmknic) or a physical network adapter or interface card (pnic), icons 174 indicating VXLANs (i.e., virtual extensible local area networks), an icon 176 indicating VLAN (virtual local area networks), and blocks 178 representing hosts 110*a* and 110*b* where the entities along pathway packet pathway 102 reside. In addition, display 150 includes an icon 180 indicating a virtual machine network interface card, an icon 182 indicating a physical router or switch that may function as a default gateway for edge router 1 (pathway entity 7), and icons 184 representing firewalls between the virtual network interface cards of the virtual machines and the networked switches or port groups.

In addition to illustrating entities along pathway 102, icons 160-184 may function as active links to additional information relating to the entity corresponding to each icon. FIG. 4A-4K illustrates sample entity information that could be provided by a user activating each corresponding type of icon. Table 2 lists for each of FIGS. 4A-4K a corresponding entity name, if indicated in Table 2, and the entity type for which the displayed information is provided. It will be appreciated that the categories or classes of information listed in each of FIGS. 4A-4K would be displayed, if available, upon activation of the corresponding icon for that type of entity, but the actual information displayed in each category or class would reflect the information for the actual entity corresponding to the icon.

TABLE 2

| FIG. | Entity Name | Information for Entity Type |
|---|---|---|
| 4A | 172.16.160.52 | Physical host |
| 4B | web-vm-2 | source, virtual machine |
| 4C | NSX Firewall | firewall |
| 4D | VDR2 | virtual distributed router |
| 4E | VXLAN Network | VXLAN Network |
| 4F | transit_logical_switch | Virtual Extensible Local Area Network (VXLAN) (distributed logical portgroup) |
| 4G | GatewayEdge2 | edge router |
| 4H | VLAN -169 | VLAN Network |
| 4I | vmnic2 | vmknic or pnic (physical nic on the physical host server) |
| 4J | 192.168.0.210 | Physical router or switch |
| 4K | VXLAN Network | VXLAN Network |

Listings of information that may be obtained by user-activation of icons in displays 100 and 150 are listed below in Tables 3A-3 according to the type of entity:

TABLE 3A

| Virtual Machine | NSX Firewall | Virtual Distributed Router | Host |
|---|---|---|---|
| Name | Applicable Firewall Rules Count and Details as | Name | Name |
| VLAN Names | Seq ID | NSX Manager IP/Name | Cluster Name |
| Logical Switch names | Name | Routing Interfaces Count and Details | VLAN Name |
| Default Gateway Address | Source | Interface Names | MTU Values |
| IP Address | Destination | IP Addresses | Power State |
| Network Addresses | Services | Network | Virtual Machine Count |
| Host name | Action | Operational Status | VMKNIC Count |
| CPU Count | | MTU | Physical NIC Count |
| Memory | | Interface Speed | Network Addresses |
| Virtual NIC Count | | | Operating System Name |
| Operating System Name | | Route Count | Firewall Status |
| Power State | | Routing Table Details | vCenter Manager |
| Data Store Name | | Network Next Hop | |
| Resource Pool Name | | | |
| Security Group Names | | Source Protocol | |
| Firewall Status vCenter Manager IP/Name | | Interface Name VNI | |

Table 3B

| VXLAN Network/Logical Switch/Virtual Wire | VLAN Network | Physical NIC (PNIC) | Distributed Virtual Port Group (DVPG) |
|---|---|---|---|
| Name | Name | Name | Name |
| Segment ID | VLAN ID | Operational Status | VxLAN Name |
| Network Address | Network Address | MTU Value | Uplink Status |
| Virtual Machine Count | Virtual Machine Count | Duplexing Status | Promiscuous Mode |
| Underlay VLAN ID | Host Names | Administrative Status | vCenter Manager IP/Name |

Table 3B-continued

| VXLAN Network/Logical Switch/Virtual Wire | VLAN Network | Physical NIC (PNIC) | Distributed Virtual Port Group (DVPG) |
|---|---|---|---|
| Underlay Subnet | Distributed Virtual Switch Name | | |
| Host Names | Distributed Virtual Port Group Name | | |
| VTEPs | | | |

TABLE 3C

| | |
|---|---|
| L3 Switch Device Name | Edge Router Name |
| Manager IP/Name | IP Addresses |
| Routing Interfaces Count and Details | Firewall Status |
| Interface Names | Next Hops |
| IP Addresses | Power Status |
| Network | CPU Count |
| Operational Status | Memory |
| MTU | Operational Statuses |
| Interface Speed | MTU Values |
| Route Count | NSX Manager IP/Name |
| Routing Table Name and Details | |
| Network | Route Count |
| Next Hop | Routing Table Details |
| Source Protocol | Network |
| Interface Name | Next Hop |
| VNI | Source Protocol |
| | Interface Name |
| | VNI |

Displays 100 and 150 may be characterized as being of multiple layers or levels in which virtual and physical entities of similar types are rendered together at the same or similar layers or levels. With reference to display 100, for example, icons 160 and 162 indicating respective virtual machines and corresponding virtual network interface cards are rendered together at a top of first layer or level 190. Icons 166 and 168 indicating respective virtual distributed routers and edge routers or gateways are rendered together at a second layer or level 192. Icons 164 and 174 indicating respective distributed virtual port groups (DVPGs) and VXLANs are rendered together as a third layer 194, with VXLAN icons 174 indicated by separate sublevels within third layer 194. Icon 176 indicating VLAN is rendered as a fourth layer or level 196. Icon 180 indicating a virtual machine network interface card or physical network interface card and icon 182 indicating a physical router or switch are rendered as a fifth level 198 and a sixth level 200, respectively.

Displays 100 and 150 can accommodate an arbitrary number of entities in a two-dimensional representation of a virtual machine packet pathway. In addition to rendering virtual and physical entities of similar types together at the same layers or levels, displays 100 and 150 further render the entities of each layer such that: the layers of entities of different types that are connected together are rendered closer together. As a result of the layer characterizations set forth above for different entity types, many or most entities along a packet pathway will be rendered as being connected to another entity that is one level above, one level below, or on the same level.

An aspect or displays 100 and 150 is that vxlans and vlans are presented so as to render a packet pathway in two-dimensional plane (i.e., display). Such a representation is difficult to achieve for a typical pathway passing through multiple vxlans, port groups, vlans across plural hosts, in part because vxlans often do not pass through all hosts involved in a packet pathway. It will be appreciated, however, that the present invention is applicable even in contexts that do not include vxlans.

Figure 5:
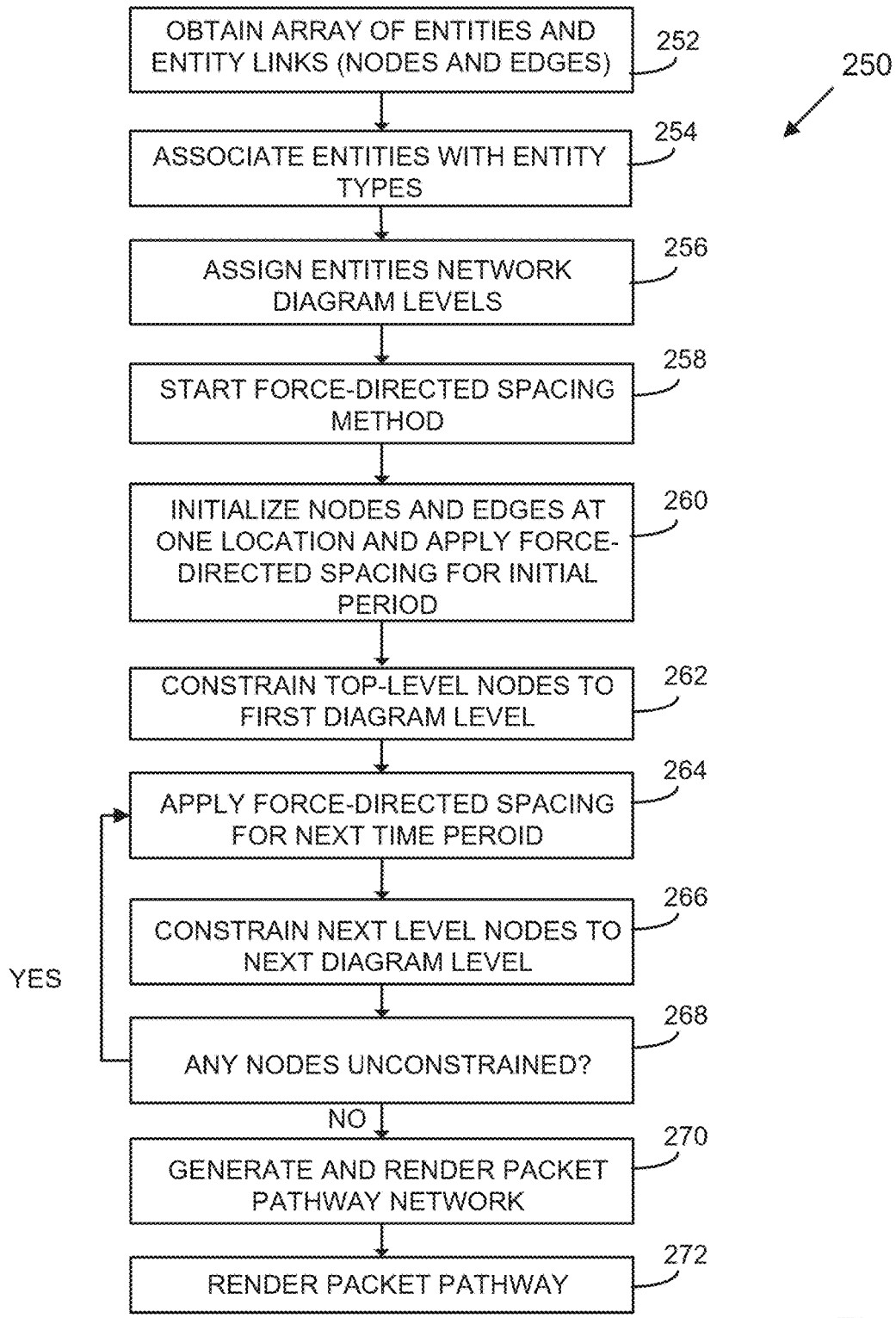
FIG. 5 is a flow diagram of a computer-executed virtual machine packet pathway placement method that avoids disentanglements in links. This is use for rendering.

FIG. 5 is a flow diagram of a computer-executed virtual machine packet pathway rendering method 250. Rendering method 250 is capable of providing a packet pathway diagram such as either of diagrams 100 and 150.

Process step 252 indicates that an array of entities and entity links (also referred to as nodes and edges, respectively) is obtained corresponding to a virtual machine-to-virtual machine packet pathway. For example, the array of entities and entity links may be obtained by operation of a datacenter management system 300 (FIG. 7), described below in greater detail.

Process step 254 indicates that each entity in the array of entities in the virtual machine-to-virtual machine packet pathway is associated with a corresponding entity type. For example, the entity types may include any or all of virtual machine, virtual machine network interface card, virtual distributed router, edge router or gateway, distributed virtual portgroups, and VXLAN, VLAN, host computer physical network interface card, physical router or switch, etc. It will be appreciated that these entity types are illustrative and that any type of virtual or physical entity could be included.

Process step 256 indicates that virtual and physical entities in a computer network or system having virtual machine entities are assigned predefined network diagram levels. In this implementation directed to rendering a packet pathway between virtual machines, virtual machines are assigned a first or top level and subsequent entities are assigned subsequent levels according to general network interconnection conventions to indicate increasingly remote physical or logical connectedness. In one implementation, entities may be assigned levels as described above with reference to levels 190-200. It will be appreciated, however, that these level assignments for these entity types are illustrative and that more or fewer levels could be applied according to any other entities included in the pathway. With different entities, level assignments can be made according to the guidelines set forth above: layers of entities of different types that are connected together are rendered closer together so that many or most entities along a packet pathway will be rendered as being connected to another entity that is one level above, one level below, or on the same level.

Process step 258 indicates the start of a force-directed spacing method for spacing and arranging icons corresponding to entities included in the packet pathway. For example, the force-directed spacing method may employ a conventional open-source Force-Layout software tool to obtain icon spacing information for entities identified as being along the packet pathway. This helps to disentangle elements and their links so they can be viewed as a flow. An example of such an open-source visualization library is D3 Force Layout by Mike Bostock available from Github.com.

In particular, linkDistance is applied as a modeled distance between nodes, and the simulated forces or factors of electrostatic repulsion or "charge," gravity, and Link-Strength are applied. The simulated forces may be applied as follows:

Electrostatic repulsion or "charge"—This is inversely proportional to the distance between any 2 objects. In one implementation, the same charge is applied to all nodes. A benefit of this implementation is that nodes are prevented from settling too close to one another. In another implementation, different nodes may be assigned different charges.

Gravity—This is a weak attraction between any two nodes and is proportional to the weights applied to them and the linear distance between them. This factor prevents the charge from causing nodes endlessly separate from each other.

Link Strength—A spring constant between two nodes that are related to each other (that is have an edge between them). This is proportional to a constant k (based on properties of the relationship) and the distance between the two. This factor brings related entities closer to each other.

Process step 260 indicates that the entities and entity links (i.e., nodes and edges, respectively) are initially defined as being together at one location in a two-dimensional plane and the force-directed spacing method is applied for a first time period, also referred to as an initial "tick time" or "number of ticks," which indicates a number of iterations of calculating the application of the interactive "forces" between the nodes. The nodes are constrained to move only in the two-dimensional plane. Over the initial "tick time" unlinked (or unlike) nodes will start to move away from each other more than linked (or like) nodes, up to the limit of a link's spring forces, so that all the nodes settle into positions relative to each other in the two-dimensional plane.

Process step 262 indicates that nodes corresponding to the first or top level, such as nodes corresponding to virtual machines of level 190, are fixed or constrained to a top-level line in the two-dimensional plane, extending from left to right in the left-to-right order they resolved or came to rest after the initial tick time.

Process step 264 indicates that the force-directed spacing method is applied for a next time period, also referred to as a next "tick time," so that all the nodes settle into positions relative to each other in the two-dimensional plane subject to the constrained line of positions of the nodes corresponding to virtual machines of level 190 and any other constrained nodes. This is applied within the scope of the container or grouping domain they fall into (for example: host computer in this case). This is a way to achieve minimal to no entanglements of links passing through them.

Process step 266 indicates that the nodes corresponding entities in the next lower level are fixed or constrained to a next line in the two-dimensional plane, parallel to top-level line, with the nodes extending from left to right in the left-to-right order they resolved or came to rest after the next tick time.

Process step 268 is a query whether any nodes remain unconstrained to a level in the two-dimensional plane. If so, process step 268 return to process step 264. If not, process step 268 proceeds to process step 270.

Process step 270 indicates that a packet pathway network (e.g., packet pathway network 109) is generated and rendered on a display screen.

Process step 272 indicates that a packet pathway (e.g., pack pathway 102) is rendered on a display screen with regard to the rendered packet pathway network.

Virtual machine packet pathway rendering method 250 employs the array of entities and entity links (i.e., nodes and edges) of a packet pathway, obtained by operation of a datacenter management system 300 (FIG. 7), to generate a packet pathway network 109 that includes a clear, accurate multi-layered or multi-leveled rendering that includes both the virtual and the physical entities in a virtual machine packet pathway 102. While utilizing a conventional, open-source Force Layout software tool or library, rendering method employs constraining of like entities to pre-selected levels and spatial sequencing of like entities to generate a packet pathway network 109 over which packet pathway 102 with minimal redundant crossings, maximal clarity, a complete information. As a result, virtual machine packet pathway rendering method 250 and a virtual entity packet pathway display 100 generated by method 250 provide a rendering of computer network information that is not otherwise available.

Figure 6:
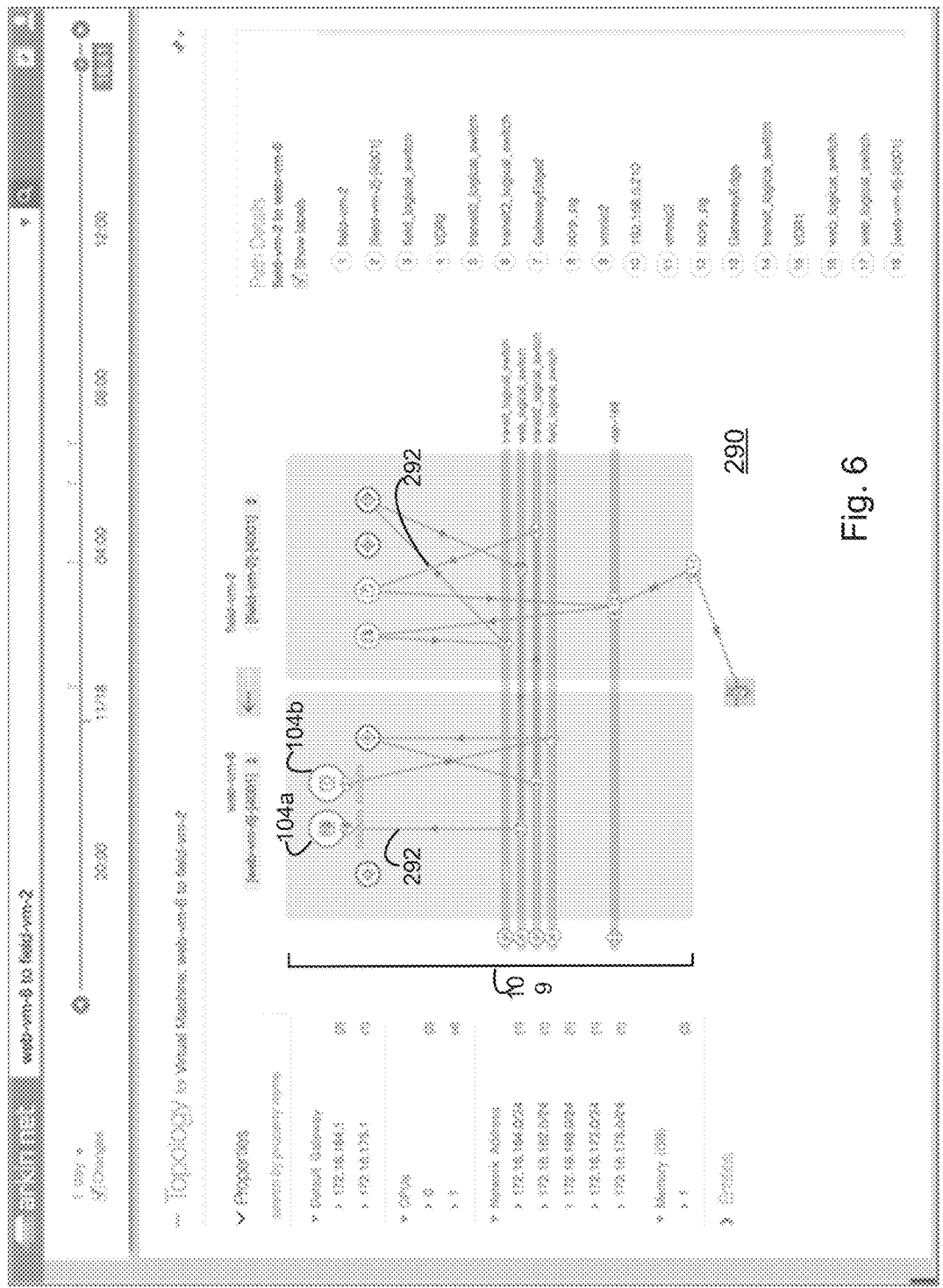
FIG. 6 is an illustration of a reverse virtual entity packet pathway display indicating a packet pathway between virtual machines.

FIG. 6 is an illustration of a virtual entity packet pathway display 290 indicating a packet pathway 292 along which a data packet would travel from virtual machine 104b (e.g., designated field-vm-2) to virtual machine 104a (e.g., designated web-vm-6). Packet pathway display 290 illustrates the reverse of packet pathway 102 shown in FIGS. 2 and 5. In this implementation, reverse pathway 292 is rendered with the physical and virtual entities in the locations they were rendered for packet pathway network 109 in packet pathway display 100. As a consequence, packet pathway 292 includes redundant pathway crossings, in comparison to packet pathway 102, arising from use of packet pathway network 109 rather than generating a new packet pathway network specifically with regard to packet pathway from virtual machine 104b (e.g., designated field-vm-2) to virtual machine 104a (e.g., designated web-vm-6). As the reverse path could be different from forward path, therefore in order to preserve the context and compare the entities involved in both the paths it is easier to do so when the location of entities are not changed. Despite the redundant pathways crossings, the use of packet pathway network 109 in packet pathway display 290 provides a clear and discernible comparison between packet pathways 102 and 292.

It will be appreciated that in an alternative embodiment, a new packet pathway network could be generated specifically for packet pathway 292 from virtual machine 104b (e.g., designated field-vm-2) to virtual machine 104a (e.g., designated web-vm-6) by operation of virtual machine packet pathway rendering method 250.

Figure 7:
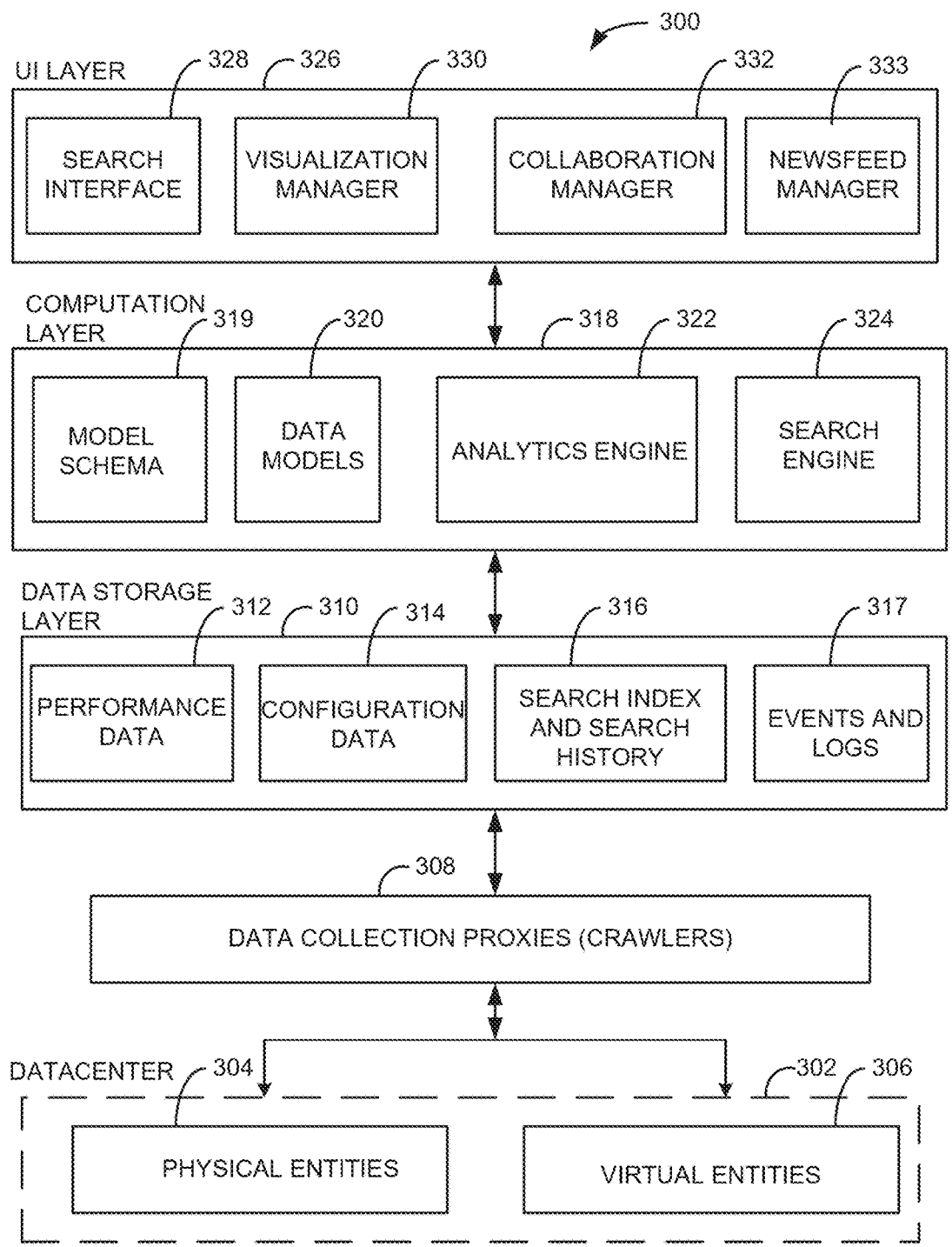
FIG. 7 is a block diagram of an example datacenter management system.

FIG. 7 is a block diagram illustrating a datacenter management system 300 as an operating environment of the present invention. A natural language based search engine operates within the context of the datacenter domain and identifies the intent of search queries. The search engine uses the models to more efficiently search and visualize current and historical events within the datacenter. The search engine also includes a collaboration feature that enables users to more effectively exchange datacenter information.

FIG. 7 depicts datacenter management system 300 in association with a datacenter 302 that includes various physical entities 304 and virtual entities 306. Physical entities 304 may comprise any physical devices used for processing, storing, and/or exchanging data. A few examples of physical entities 304 include application servers, storage servers, load balancers, network interface cards (NICs), firewalls, switches, routers, client devices, etc. Virtual entities 306 may include any entities virtualized in software, such as virtual machines (VM), virtual firewalls, virtual switches, virtual routers, virtual local area networks, virtual extensible local area networks (VXLANs), etc. Datacenter 302 also may include different logical entity relationships, such as layer 2 and layer 3 logical networks. These are just examples of an almost limitless number of different physical and virtual entities and relationships that may exist within datacenter 302.

Datacenter management system 300 may use time-series based modeling of entities and properties (Objects) to effectively capture the evolving state of a datacenter. Models represent physical, virtual, and logical entities and entity relationships for different periodic and aperiodic events. The management system captures different states data, static and dynamic relationships data, statistics, events data, performance data and configuration data associated with the entities. The performance data measures performance of different entities, such as central processing unit (CPU) utilization, memory utilization, packet drops, etc. The configuration data identifies configurations within entities, such as the number of CPUs assigned to a virtual machine or the rules used by a physical or virtual firewall or the implied set of virtual machines affected by a virtual or physical firewall rule.

Data collection proxies 308 are alternatively referred to as crawlers and collect and store data from physical entities 304 and virtual entities 306 in a data storage layer 310. The data may include performance data 312, configuration or change data 314, and event and log data, such as alerts, problems, faults, etc. Management system 300 also may store search indexes and search histories 316 from search queries.

Performance data 304 may be associated with the performance of any entity or combination of entities in datacenter 302. Examples of performance data 312 include CPU utilization, packet processing, packet transmission and reception drops, memory utilization, etc. Examples of configuration data 314 include any information associated with the configuration of any entity or combination of entities in datacenter 302. Examples of configuration data 314 include a number of CPUs assigned to a VM, network and communication paths in a VXLAN, rules in a physical or virtual firewall, NICs connected to a VM, changes in system configurations, etc. These are just a few examples of almost limitless types of performance and configuration data.

Data collection proxies 308 may periodically collect performance data 312 and/or configuration data 334. For example, proxies 308 may monitor CPU utilization for a VM every ten minutes and save the utilization values as part of performance data 312. Data collection proxies 308 may aperiodically collect other performance data 312 and/or configuration data 314. For example, collection proxies 308 may identify the number of CPUs assigned to a VM as part of configuration data 314.

Data collection proxies 308 may include any combination of existing and customized programs for monitoring and extracting data from entities 304 and 306. For example, physical entities 304, such as routers and switches, may include application program interfaces (APIs) for extracting CPU utilization, memory utilization, packet drops, routing tables, logged data, address resolution protocol (ARP) tables, etc.

A computation layer 318 uses the data in storage layer 310 to provide information to a user interface layer 326. A model schema 319 identifies the general relationships and properties associated with entities in datacenter 302. Data models 320 represent the particular performance data 312 and configuration data 314 associated with the entities in datacenter 302. For example, CPU and memory utilization, logical and physical connections, end-to-end communication paths, logical layer 2 and layer 3 network connections, application topologies, VXLAN topologies, port groups, etc. Some data models 320 are manually created and other data models 320 may be dynamically generated.

Analytics engine 322 automatically monitors and identifies data and other events. Analytics engine 322 may include event detectors that identify significant events in datacenter 302. For example, the event detector may identify configuration changes and event data representing the performance status of datacenter 302. Analytics engine 322 may also operate as outlier detector that identifies events that are outside normal operating levels. For example, an outlier detector may identify CPU utilization above a particular threshold level. Analytics engine 322 may also operate as a problem detector that identifies problems in datacenter 302. For example, the problem detector may identify large packet losses or configuration mismatches between entities.

Search engine 324 conducts natural language searches within datacenter 302 and identifies a search query intent based on model schema 319 and a datacenter dictionary. Instead of operating just on keywords, search engine 324 also understands search query phrases that may be part natural language and part expression. This provides richer intent expression, greater ease of use, and applies well to the datacenter problem domain. For example, a search term such as TROUBLESHOOT may cause search engine 324 to search problem data generated by analytics engine 322.

Search engine 324 may operate as a time machine executing queries for specified time intervals. For example, a user may enter a search term requesting search engine 324 to show all configuration changes for a specified network over the past two days. In another example, the user may enter a search term requesting CPU usage for a host device over the last two days. Data models 320 may be configured in a unique time series format that enables search engine 324 to quickly identify events for any selectable time period.

Data models 320 may include identifiers associated with different physical and virtual entities, networks, performance data, and/or configuration data. Search engine 324 may search for data or provide search suggestions based on data models 320. For example, one of data models 320 for a virtual firewall may contain firewall rules. A user may enter the search term RULES. Search engine 324 may identify the firewall rules in the model or provide a suggestion for displaying the rules identified in the virtual firewall model.

User interface layer 326 includes a search interface 328 for receiving search queries and displaying search results. Search interface 328 may receive natural language based expressions for search engine 324 and display the results from search engine 324 in a textual and/or graphical format. A visualization manager 330 generates topology diagrams representing different entities and network configurations within the datacenter.

A collaboration manager 332 captures particular states of the datacenter and enables different users to view, share, and manipulate the captured states. For example, a first user may identify a network state where a large number of packets are being dropped. The first user may direct collaboration manager 332 to capture that state of the network and identify a second user for sharing the captured state. The second user can access the captured network state and perform additional analysis.

A newsfeed manager 333 identifies and displays events of particular interest to the user. For example, newsfeed manager 333 may identify a search index and/or search history 316 for a user currently logged on to the system. For example, a user may have previously performed search queries for a particular logical network. When the user logs in, newsfeed manager 333 may automatically display events associated with the previously queried logical network.

Search engine 324 and search interface 328 together function as a search system that provides interpretation of computer network status search queries that are entered by users, and performs corresponding searches relating to datacenter 302. Examples of interpretations of computer network status search queries, which are syntactically similar, include:

- "vm web-vm-1"=>"find virtual machine named web-vm-1" since web-vm-1 looks like a virtual machine name.
- "vm 192.168.0.0/16"=>"find all virtual machines in subnet 192.168.0.0/16" since 192.168.0.0/16 depicts a subnet.
- "vm cpu 1"=>"find virtual machines where num cpu=1" since cpu probably refers to property called "num cpu" and 1 is a possible value for this property.
- "vm powered on"=>"find virtual machines where power state=on" since "powered on" is commonly used to refer to property "power state" having the value "on".

In some instances, a computer network status search query can suggest more than one interpretation, even if one interpretation is deemed more likely than another, so that the more-likely interpretation is offered as a default, but a user-selectable alternative interpretation is also offered:

- "vm cpu"=>"show num cpu, cpu usage of virtual machines" since cpu probably refers to cpu related properties, but an alternative user-selectable interpretation that is offered can be "find virtual machine named cpu".
- "vm not behind firewall"=>"find virtual machines where firewall status='unprotected' or firewall status='excluded'" since "not behind firewall" refers to property "firewall status" having a value 'unprotected' or 'excluded,' but an alternative user-selectable interpretation that is offered can be "find virtual machines where firewall status='unprotected'" as the user might only be interested in property "firewall status" having the value "unprotected".

As illustrated by the examples above, search queries with similar syntactic structure can have very different interpretations.

Figure 8:
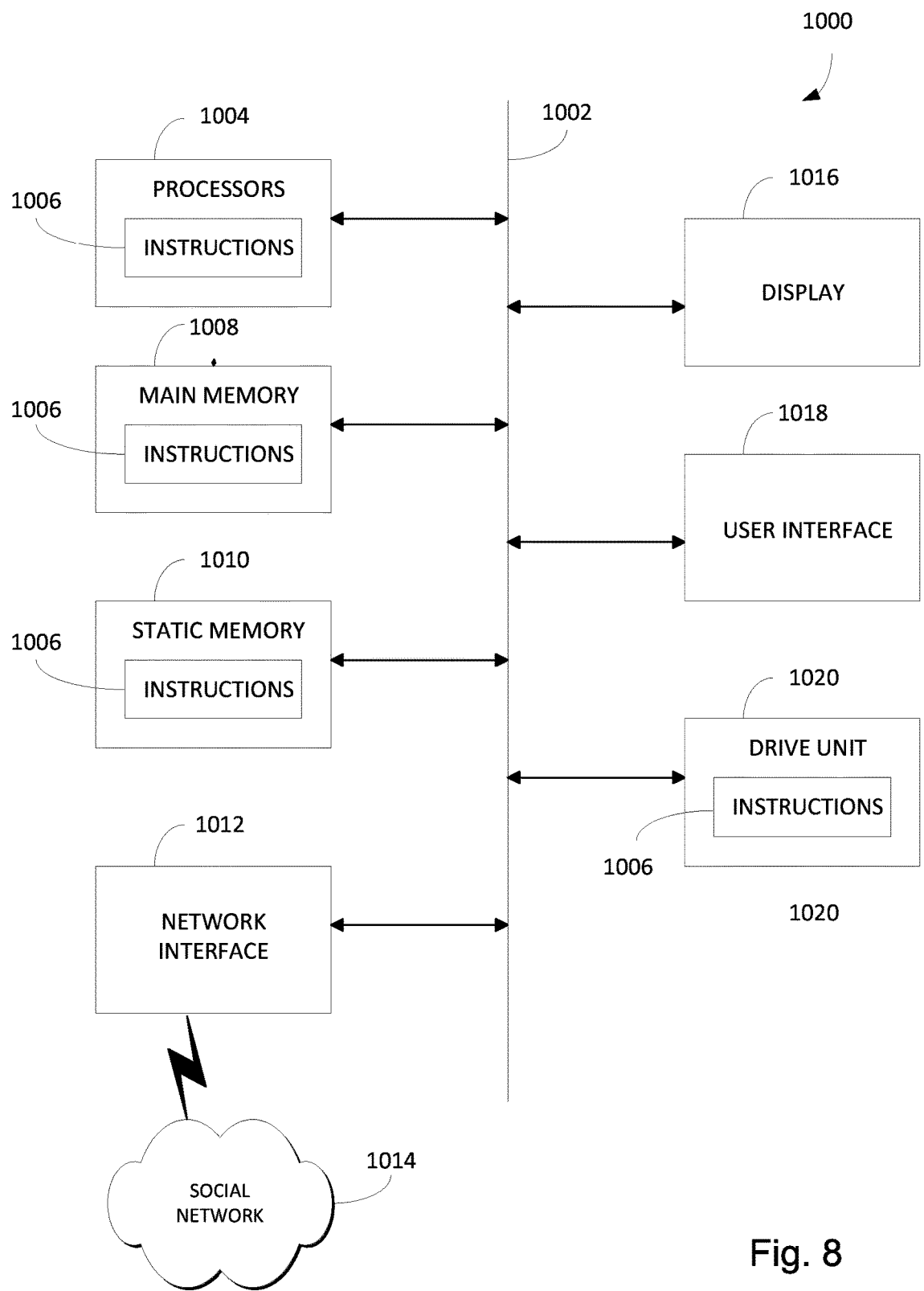
FIG. 8 depicts an example computing device for implementing the datacenter management system.

FIG. 8 shows a computing device 1000 that may be used for operating the datacenter management system and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, touchpad, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

It will be obvious to those having skill in the art that many changes may be made to the details of the above-described embodiments without departing from the underlying principles of the invention. The scope of the present invention should, therefore, be determined only by the following claims.

The invention claimed is:

1. A computerized virtual entity pathway visualization system, comprising:
   a computer system management system that provides modeling of a computer system having physical and virtual entities and identifies a packet pathway from a source virtual entity in the computer system to a destination virtual entity in the computer system;
   a computer display screen having rendered thereon the packet pathway and an arrangement of plural active icons corresponding to physical and virtual entities included in the packet pathway from the source virtual entity to the destination virtual entity, wherein the rendered packet pathway visually indicates a direction of the packet pathway from the source virtual entity to the destination virtual entity.

2. The system of claim 1 in which the arrangement of plural active icons on the computer display screen positions the source and destination virtual entities as uppermost of the plural active icons.

3. The system of claim 2 in which the virtual entities include one or more virtual networking elements, each with at least one virtual network switch, and at least one physical network element with a physical network switch, and in which the arrangement of plural active icons on the computer display screen positions the one or more virtual networking elements below the source and destination virtual entities and above the at least one physical network element.

4. The system of claim 1 in which the physical entities include one or more physical host computers on which reside physical and virtual entities included in the packet pathway, including the source and destination virtual entities, and in which the computer display screen further includes a rendering of the one or more physical host computers, each in association with the active icons of the physical and virtual entities that reside thereon.

5. The system of claim 1 in which the computer system includes one or more other virtual entities in the packet pathway, the other virtual entities being other than the source and destination entities and other than the virtual network switch or switches of the virtual networking element or elements, and in which arrangement of plural active icons on the computer display screen positions the other virtual entities below the source and destination virtual entities and above the one or more virtual networking elements.

6. The system of claim 5 in which the arrangement of plural active icons on the computer display screen positions the source and destination virtual entities and the other virtual entities laterally offset from each other.

7. The system of claim 5 in which the virtual entities include plural virtual networking elements, each with at least one virtual network switch, and in which the arrangement of plural active icons on the computer display screen positions the virtual network switches of the virtual networking elements laterally offset from each other.

8. The system of claim 6 in which the virtual entities include plural virtual networking elements, each with at least one virtual network switch, and in which the arrangement of plural active icons on the computer display screen positions the virtual network switches of the virtual networking elements laterally offset from each other.

9. The system of claim 1 in which the source and destination virtual entities correspond to virtual machines.

10. The system of claim 3 in which the one or more virtual networking elements include a virtual extensible local area network and/or virtual local area network.

11. The system of claim 1 in which the computer system is included in a datacenter.

12. A computerized virtual entity pathway visualization method, comprising:
   modeling of a computer system having physical and virtual entities;
   identifying a packet pathway from a source virtual entity in the computer system to a destination virtual entity in the computer system; and
   rendering on a computer display screen a packet pathway and an arrangement of plural active icons corresponding to physical and virtual entities included in the packet pathway from the source virtual entity to the destination virtual entity, wherein the rendered packet pathway visually indicates a direction of the packet pathway from the source virtual entity to the destination virtual entity.

13. The method of claim 12 in which rendering the arrangement of plural active icons on the computer display screen includes positioning the source and destination virtual entities as uppermost of the plural active icons.

14. The method of claim 13 in which the virtual entities include one or more virtual networking elements, each with at least one virtual network switch, and at least one physical network element with a physical network switch, and in which rendering the arrangement of plural active icons on the computer display screen includes positioning the one or more virtual networking elements below the source and destination virtual entities and above the at least one physical network element.

15. The method of claim 12 in which the physical entities include one or more physical host computers on which reside physical and virtual entities included in the packet pathway, including the source and destination virtual entities, and in which rendering the arrangement of plural active icons on the computer display screen includes rendering the one or more physical host computers, each in association with the active icons of the physical and virtual entities that reside thereon.

16. The method of claim 12 in which the computer system includes one or more other virtual entities in the packet pathway, other than the source and destination entities and other than the virtual network switch or switches of the virtual networking element or elements, and in which rendering the arrangement of plural active icons on the computer display screen includes positions positioning the other virtual entities below the source and destination virtual entities and above the one or more virtual networking elements.

17. The method 16 in which rendering the arrangement of plural active icons on the computer display screen includes positioning the source and destination virtual entities and the other virtual entities laterally offset from each other.

18. The method of claim 16 in which the virtual entities include plural virtual networking elements, each with at least one virtual network switch, and in which rendering the arrangement of plural active icons on the computer display screen includes positioning the virtual network switches of the virtual networking elements laterally offset from each other.

19. The method of claim 17 in which the virtual entities include plural virtual networking elements, each with at least one virtual network switch, and in which rendering the arrangement of plural active icons on the computer display screen includes positioning the virtual network switches of the virtual networking elements laterally offset from each other.

20. The method of claim 12 further including displaying entity information in response to user-activation of an icon.

\* \* \* \* \*